(12) United States Patent
Monteil et al.

(10) Patent No.: US 7,094,854 B2
(45) Date of Patent: Aug. 22, 2006

(54) ETHYLENE/BUTADIENE COPOLYMERS, CATALYTIC SYSTEM AND PROCESS FOR THE SYNTHESIS THEREOF

(75) Inventors: Vincent Monteil, Romans-sur-Isere (FR); Roger Spitz, Lyons (FR); Christophe Boisson, Tramoyes (FR)

(73) Assignees: Michelin Recherche et Technique S.A., Granges-Paccot (CH); Total Petrochemicals Research Feluy, Seneffe (BE)

( * ) Notice: Subject to any disclaimer, the term of this patent is extended or adjusted under 35 U.S.C. 154(b) by 0 days.

(21) Appl. No.: 11/106,619

(22) Filed: Apr. 15, 2005

(65) Prior Publication Data

US 2005/0239639 A1 Oct. 27, 2005

Related U.S. Application Data

(63) Continuation of application No. PCT/EP03/11303, filed on Oct. 13, 2003.

(30) Foreign Application Priority Data

Oct. 16, 2002 (FR) .................................. 02 12893

(51) Int. Cl.
*C08F 236/06* (2006.01)
(52) U.S. Cl. ...................... 526/339; 526/137; 526/160; 526/164; 502/117; 502/153
(58) Field of Classification Search ................ 526/339, 526/127, 160, 164; 502/117, 153
See application file for complete search history.

(56) References Cited

U.S. PATENT DOCUMENTS 5,191,052 A * 3/1993 Welborn, Jr. ................. 526/339
6,569,799 B1 * 5/2003 Barbotin et al. ............. 502/152

FOREIGN PATENT DOCUMENTS

EP 1 092 731 A1 4/2001

OTHER PUBLICATIONS

Llauro, Marie France et al., "Investigation of ethylene/butadiene copolymers microstructure by 1H and 13C NMR", Macromolecules 2001, 34, pp. 6304-6311, XP002244179, (2001).
Nakamura, Hiroshi et al., "Alternative.eta.5- and eta. 6-Bonding Modes for Bis(fluorenyl)lanthanide Complexes by Reactions with A1R3 and Successive Addition of THF", Organometallics 2000, 19 (24), pp. 5392-5399 XP002244180 (2000).
Evans, William J. et al., "Copolymerization of Ethylene Carbonate and epsilon.-Caprolactone Using Samarium Complexes", MACROMOLECULES 1994, 27 (14), pp. 4011-4013, XP002244181 (1994).

CUI, Liqiang et al., "Preliminary Investigations on polymerization catalysts composed of lanthanocene and methylaluminoxane", Polymer Bulletin, Springer Verlag. Heidenberg, DE, vol. 40, No. 6, pp. 729-734, XP000755393, (Jun. 1, 1998).
Llauro, Marie France et al., "Investigation of ethylene/butadiene copolymers microstructure by 1H and 13C NMR", Macromolecules 2001, 34, pp. 6304-6311, XP002244179, (2001).
Nakamura, Hiroshi et al., "Alternative.eta.5- and eta. 6-Bonding Modes for Bis(fluorenyl)lanthanide Complexes by Reactions with A1R3 and Successive Addition of THF", Organometallics 2000, 19 (24), pp. 5392-5399 XP002244180 (2000).

(Continued)

*Primary Examiner*—Fred Teskin
(74) *Attorney, Agent, or Firm*—Buchanan Ingersoll PC

(57) ABSTRACT

Disclosed are ethylene and butadiene copolymers and a catalytic system usable for the synthesis of these copolymers. The copolymers have a molar content of units resulting from butadiene of $\geq 8\%$, said units comprising trans-1,2 cyclohexane linkages, and a number-average molecular mass Mn of $\geq 40,000$ g/mol. The catalytic system includes:

(i) an organometallic complex represented by one of the following formulae A or B:

A:

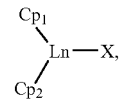

B:

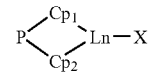

where Ln represents a lanthanide and X a halogen, where, in the formula A, two ligand molecules $Cp_1$ and $Cp_2$ each consisting of a fluorenyl group, are attached to Ln, where, in the formula B, a ligand molecule consisting of two fluorenyl groups $Cp_1$ and $Cp_2$, joined together by a bridge P of formula $MR_2$, where M is an element of column IVa and R is an alkyl with 1 to 20 carbon atoms, is attached to Ln, and (ii) a co-catalyst selected from an alkylmagnesium, an alkyllithium, an alkylaluminium, a Grignard reagent, or a mixture of these constituents. The (co-catalyst/organometallic complex) molar ratio falls within a range of from 1 to 8.

22 Claims, No Drawings

OTHER PUBLICATIONS

Evans, William J. et al., "Copolymerization of Ethylene Carbonate and epsilon.-Caprolactone Using Samarium Complexes", MACROMOLECULES 1994, 27 (14), pp. 4011-4013, XP002244181 (1994).

CUI, Liqiang et al., "Preliminary Investigations on polymerization catalysts composed of lanthanocene and methylaluminoxane", Polymer Bulletin, Springer Verlag. Heidenberg, DE, vol. 40, No. 6, pp. 729-734, XP000755393, (Jun. 1, 1998).

International Search Report issued in Application No. P/EP03/11303.

* cited by examiner

ETHYLENE/BUTADIENE COPOLYMERS, CATALYTIC SYSTEM AND PROCESS FOR THE SYNTHESIS THEREOF

CROSS-REFERENCE TO RELATED APPLICATION

The present application is a continuation of PCT Application No. PCT/EP2003/011303, filed Oct. 13, 2003, published in French on Apr. 29, 2004, as WO 2004/035639, which claims priority of French Application No. 02/12893, filed Oct. 16, 2002, the entire contents of both applications being incorporated herein in their entirety.

BACKGROUND OF THE INVENTION

1. Field of the Invention

The present invention relates to copolymers of ethylene and butadiene, to a catalytic system usable for the synthesis of these copolymers and to a process for synthesising these copolymers by means of this catalytic system.

2. Description of Related Art

It is known to use catalytic systems based on halogenated complexes of transition metals such as titanium for copolymerising ethylene and a conjugated diene.

Japanese patent specifications JP-A-10 237 131, JP-A-09 316 118 and JP-A-11 171 930 disclose copolymers of ethylene and butadiene in which the butadiene may be inserted in the form of cis-1,4, trans-1,4, -1,2, cis-cyclopentyl and trans-cyclopentyl linkages. These copolymers are obtained by means of a catalytic system comprising dimethylsilyl(pentamethylcyclopentadienyl)(t-butylamide)titanium dichloride and methylalumoxane.

It is also known to use catalytic systems based on halogenated lanthanide complexes in order to copolymerise ethylene and a conjugated diene.

In particular, patent specification EP-A-1 092 731 and the article "Macromolecules, vol. 33, no. 23, pp. 8521–8523 (2000)" teach in their copolymerization tests that associating a co-catalyst selected from among a group comprising an alkylmagnesium, an alkyllithium, an alkylaluminium, a Grignard reagent or a mixture of these constituents, with an organometallic complex represented by one of the following generic formulae A or B:

A:

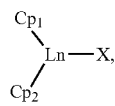

B:

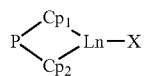

where Ln represents a lanthanide metal having an atomic number which may range from 57 to 71, where X represents a halogen which may be chlorine, fluorine, bromine or iodine, where, in the formula A, two identical or different ligand molecules $Cp_1$, $Cp_2$, each consisting of a substituted or unsubstituted cyclopentadienyl or fluorenyl group, are attached to Ln where, in the formula B, a ligand molecule consisting of two cyclopentadienyl or fluorenyl groups $Cp_1$ and $Cp_2$, which are substituted or unsubstituted and are linked together by a bridge P satisfying the formula $MR_2$, where M is an element of column IVa of Mendeleyev's periodic table and where R is an alkyl group with 1 to 20 carbon atoms, is attached to said metal Ln, where the (co-catalyst/organometallic complex) ratio is equal to 20, makes it possible to synthesize copolymers of ethylene and a conjugated diene with a satisfactory polymerisation yield.

In said document EP-A-1 092 731, it would seem that the copolymers obtained comprise units resulting from the butadiene which, depending upon the catalytic system used, may or may not comprise linkages in the form of trans-1,2 cyclohexane. Furthermore, the copolymers obtained in said document exhibit, when they have a molar content of units resulting from butadiene of at least 8%, a number-average molecular mass Mn, measured by the polystyrene equivalent size exclusion chromatography technique (SEC technique described in the attached appendix), which is low, always being distinctly below 40,000 g/mol.

SUMMARY OF THE INVENTION

One aim of the present invention is to propose a novel catalytic system usable for the synthesis of specific ethylene and butadiene copolymers which have a molar content of units resulting from butadiene of at least 8%, have trans-1,2 cyclohexane linkages in said units and have a molecular weight Mn greater than that of the copolymers obtained in said document EP-A-1 092 731.

Said aim is achieved, as the applicants have just surprisingly discovered, in that, by selecting, in the above-stated catalytic system of said document EP-A-1 092 731:

(i) two ligand molecules $Cp_1$ and $Cp_2$, which may be identical or different, attached to the metal Ln and each consisting of a substituted or unsubstituted fluorenyl group, if said organometallic complex complies with said formula A, or of one ligand molecule attached to the metal Ln and consisting of two fluorenyl groups $Cp_1$ and $Cp_2$, which may be identical or different, substituted or unsubstituted and linked together by a bridge P of formula $MR_2$, where M is an element of column IVa and R is an alkyl group with 1 to 20 carbon atoms, if said organometallic complex complies with said formula B, and (ii) a (co-catalyst/organometallic complex) molar ratio belonging specifically to a range from 1 to 8, it is possible to obtain copolymers of ethylene and butadiene with a satisfactory polymerisation yield, said copolymers always comprising trans-1,2 cyclohexane linkages within the units resulting from butadiene, a molar content of said units resulting from butadiene which is greater than or equal to 8% and a molecular mass Mn, measured in accordance with the polystyrene equivalent SEC technique specified in the attached appendix, which is greater than or equal to 40,000 g/mol.

To the applicants' knowledge, these combined characteristics of trans-1,2 cyclohexane linkages, a molar content of units resulting from butadiene of at least 8% and an elevated molecular mass Mn have never hitherto been achieved for ethylene and butadiene copolymers.

It will be noted that it was not obvious to obtain such high molecular masses Mn for ethylene and butadiene copolymers obtained by means of a catalytic system based on a halogenated lanthanide complex and exhibiting this molar content of units resulting from butadiene. Indeed, it is well known to the person skilled in the art (see the above-mentioned article "Macromolecules, vol. 33, no. 23, pp.

8521–8523 (2000)") that the copolymers obtained by means of such a catalytic system have a molecular mass Mn which is higher (or lower), the lower (or respectively higher) is the molar content of units resulting from butadiene.

It will also be noted that using specific fluorenyl groups makes it possible to obtain trans-1,2 cyclohexane linkages in the resultant copolymers, and that the very low value of the (co-catalyst/organometallic complex) molar ratio makes it possible to obtain copolymers which have a content of at least 8% of units resulting from butadiene while nevertheless exhibiting a high molecular mass Mn.

DETAILED DESCRIPTION OF THE INVENTION

Preferably, the copolymers according to the invention are such that their units resulting from butadiene comprise linkages in the form of trans-1,2 cyclohexane in a molar fraction of greater than or equal to 1% and, even more preferably, of greater than or equal to 5%. Reference may be made to the article "Investigation of ethylene/butadiene copolymer microstructure by $^1$H and $^{13}$C NMR, Llauro M. F., Monnet C., Barbotin F., Monteil V., Spitz R., Boisson C., Macromolecules 2001, 34, 6304–6311" for a detailed description of the $^1$H NMR and $^{13}$C NMR, which were the particular methods used in the present application for determining the molar fractions of these trans-1,2 cyclohexane linkages.

Advantageously, the ethylene and butadiene copolymers according to the invention have a mass Mn greater than or equal to 50,000 g/mol and even greater than or equal to 80,000 g/mol, preferably by using a (co-catalyst/organometallic complex) molar ratio value equal to or substantially equal to 2, for example with a range of from 1 to 3.

Still more advantageously, these copolymers according to the invention may have a mass Mn greater than or equal to 100,000 g/mol, and even greater than or equal to 200,000 g/mol or 300,000 g/mol.

Likewise advantageously, the copolymers according to the invention furthermore have a molar content of units resulting from butadiene which is greater than or equal to 10%, and which may even be greater than or equal to 15%.

Still more advantageously, the ethylene and butadiene copolymers according to the invention may have a molar content of units resulting from butadiene which is greater than or equal to 20%, and which may even be greater than or equal to 30%.

It will be noted that the copolymers according to the invention may advantageously have in combination, on the one hand, a molecular mass Mn of greater than or equal to 40,000 g/mol and, on the other hand, a molar content of units resulting from butadiene of greater than or equal to 15%, perhaps of greater than or equal to 20% and even of greater than or equal to 30%.

It will also be noted that the copolymers according to the invention may advantageously have in combination, on the one hand, a mass Mn of greater than or equal to 100,000 g/mol and, on the other hand, a molar content of said units of greater than or equal to 15%, even of greater than or equal to 20%.

It will also be noted that the copolymers according to the invention may advantageously have in combination, on the one hand, a mass Mn of greater than or equal to 200,000 g/mol and, on the other hand, a molar content of said units of greater than or equal to 15%, even of greater than or equal to 20%.

It will also be noted that the copolymers according to the invention may advantageously have in combination, on the one hand, a mass Mn of greater than or equal to 300,000 g/mol and, on the other hand, a molar content of said units of greater than or equal to 15%, even of greater than or equal to 20%.

According to another characteristic of the invention, the copolymers according to the invention have a polydispersity index Ip which is less than 3.5. Preferably, the Ip index of said copolymers is less than or equal to 3 and, even more preferably, said Ip index is less than or equal to 2.5. Following the example of the molecular weights Mn, the polydispersity indices Ip were determined in the present application by size exclusion chromatography (SEC technique described in the attached appendix).

The copolymers according to the invention preferably have a glass transition temperature Tg which is below −10° C. More precisely, these copolymers may, for example, have a temperature Tg of between −20° C. and −50° C.

This temperature Tg is measured in the present application the "DSC" (Differential Scanning Calorimetry) method using a "Setaram DSC 131" instrument. The temperature program used corresponds to a rise in temperature from −120° C. to 150° C. at a rate of 10° C./min.

The copolymers of the invention exhibit the following microstructural characteristics:

trans-1,4; 1,2 (vinyl) and trans-1,2 cyclohexane linkages.

More precisely, if the organometallic complex used is an unbridged complex satisfying said generic formula A and comprising two fluorenyl groups, said complex then preferably satisfying the formula $(C_{13}H_9)_2NdCl$, the majority of the butadiene will be inserted in the copolymer chain by trans-1,4 linkages (i.e. the units resulting from butadiene comprise trans-1,4 linkages in a molar fraction of greater than 50%, typically of greater than 70%).

If, however, according to a preferred embodiment of the invention, the organometallic complex used is a bridged complex satisfying said generic formula B and comprising two groups fluorenyl, said complex then preferably satisfying the formula $[(C_{13}H_8)_2SiMe_2]NdCl$, the copolymer according to the invention will be such that its units resulting from butadiene comprise linkages in the form of trans-1,2 cyclohexane in a molar fraction of greater than or equal to 10%, advantageously of greater than or equal to 20% and, still more advantageously, of greater than 50%.

A catalytic system according to the invention for obtaining said copolymers comprises:

(i) said organometallic complex represented by one of the following formulae A or B:

A:

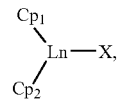

B:

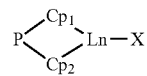

where Ln is a lanthanide with an atomic number of from 57 to 71, preferably neodymium, where X represents a halogen which may be chlorine, fluorine, bromine or iodine, where, in the formula A, two identical or different ligand molecules $Cp_1$, $Cp_2$, each consisting of a substituted or unsubstituted fluorenyl group, are attached to Ln, where, in the formula B, a ligand molecule consisting of two identical or different fluorenyl groups $Cp_1$ and $Cp_2$, which are substituted or unsubstituted and are linked together by a bridge P of formula $MR_2$, where M is an element of column IVa, preferably silicon, and R is an alkyl group with 1 to 20 carbon atoms, is attached to Ln, and (ii) a co-catalyst belonging to the group consisting of an alkylmagnesium, an alkyllithium, an alkylaluminium, a Grignard reagent, or consisting of a mixture of these constituents, and this catalytic system according to the invention is such that the (co-catalyst/organometallic complex) molar ratio falls within a range of from 1 to 8.

Preferably, said (co-catalyst/organometallic complex) molar ratio falls within a range of from 1 to 3 for the synthesis of copolymers having both a molecular mass Mn of greater than or equal to 100,000 g/mol and a molar content of units resulting from butadiene which is greater than or equal to 8%.

According to a preferred example of embodiment of the invention, $Cp_1$ and $Cp_2$ each comprise an identical unsubstituted fluorenyl group.

If the formula A applies, $Cp_1$ and $Cp_2$ each consist of a fluorenyl group of formula $C_{13}H_9$, and the organometallic complex satisfies the formula $(C_{13}H_9)_2NdCl$.

If the formula B applies, $Cp_1$ and $Cp_2$ each consist of a fluorenyl group of formula $C_{13}H_8$, and the organometallic complex satisfies the formula $[(C_{13}H_8)_2SiMe_2]NdCl$.

Generally, if $Cp_1=Cp_2=Cp$, an unbridged organometallic complex according to the invention satisfying said generic formula A is prepared:

in a step (1), by reacting a hydrogenated ligand molecule, represented by the formula HCp, with an alkyllithium in order to obtain a lithium salt, then in a step (2), by reacting said salt in a complexing solvent with an anhydrous trihalide of a lanthanide which is represented by the formula $LnX_3$, where X represents a halogen which may be chlorine, fluorine, bromine or iodine, then in a step (3), by evaporating said complexing solvent, then, in a non-complexing solvent, extracting the product obtained at the end of the second step, and optionally, in a step (4), by crystallising the product extracted at the end of said third step, in order to obtain said organometallic complex of formula A totally free of said complexing solvent.

Likewise generally, if $Cp_1=Cp_2=Cp$, a bridged organometallic complex according to the invention satisfying said generic formula B is prepared:

in a step (1a), by reacting a hydrogenated ligand molecule, represented by the formula HCp, with an alkyllithium in order to obtain a lithium compound, then in a step (1b), by reacting the lithium compound obtained in step (1a) in a complexing solvent with a dihalide of said bridge of formula $MR_2$, for example of formula $SiMe_2Cl_2$ (where Me is a methyl group), in order to obtain a compound of formula $MR_2Cp_2$, then in a step (1c), by reacting the compound obtained in step (1b) in a non-complexing solvent with an alkyllithium in order to obtain a lithium salt of formula $MR_2Cp_2Li_2$, then in a step (2), by reacting said salt in a complexing solvent with an anhydrous trihalide of a lanthanide which is represented by the formula $LnX_3$, where X represents a halogen which may be chlorine, fluorine, bromine or iodine, then in a step (3), by evaporating said complexing solvent, then, in a non-complexing solvent, extracting the product obtained at the end of the second step, and optionally, in a step (4), by crystallising the product extracted at the end of said third step, in order to obtain said organometallic complex of formula B totally free of said complexing solvent.

In said steps (1) and (1a), (1c), butyllithium is preferably used as the alkyllithium.

In said steps (2) and (1b), tetrahydrofuran is preferably used as the complexing solvent. Furthermore, two mol of said lithium salt are advantageously reacted with 1 or 2 mol of said lanthanide trihalide.

In said steps (3) and (1c), toluene or heptane is preferably used as the non-complexing solvent.

As for said co-catalyst, in the event that it consists of a mixture of an alkylaluminium and an alkyllithium, these two constituents are advantageously present in said mixture in stoichiometric or close to stoichiometric quantities, in order to achieve satisfactory catalytic activity.

In this co-catalyst, butyloctylmagnesium is advantageously used as the alkylmagnesium, butyllithium as the alkyllithium, diisobutylaluminium hydride as the alkylaluminium and butylmagnesium chloride as the Grignard reagent.

Said co-catalyst preferably belongs to the group consisting of butyloctylmagnesium and butylmagnesium chloride and, still more preferably, said co-catalyst is butyloctylmagnesium.

The process for synthesis of the copolymers according to the invention comprises the reaction in suspension or solution in a hydrocarbon solvent, such as toluene, at a temperature of between −20° C. and 120° C., of the catalytic system according to the invention in the presence of ethylene and butadiene.

This reaction is performed in a reactor under variable pressure, preferably of from 3 bar to 50 bar, and preferably at a temperature of between 20° C. and 90° C.

The lanthanide concentration in the reaction medium is advantageously less than 0.3 mmol/l. As for the molar fraction of butadiene in said reaction medium, said fraction is advantageously between 5% and 80%.

The aforementioned characteristics of the present invention, as well as others, will be better understood on reading the following description of several examples of embodiment of the invention, which are given by way of non-limiting illustration.

All the following Examples were performed under argon and the solvents used had previously been dried by reaction with sodium followed by distillation or with a 3 Å molecular sieve under a stream of argon.

The microstructure of each copolymer obtained in these Examples was determined using $^1H$ NMR and $^{13}C$ NMR techniques. A "BRUKER DRX 400" spectrometer was used for this purpose at a frequency of 400 MHz for the $^1H$ NMR and of 100.6 MHz for the $^{13}C$ NMR. Reference may be made to the article "Investigation of ethylene/butadiene copolymer microstructure by $^1H$ and $^{13}C$ NMR, Macromolecules 2001, 34, 6304–6311" for a detailed description of these $^1H$ NMR and $^{13}C$ NMR techniques used in the Examples.

First Series of Copolymerization Tests—"Control" and According to the Invention

These tests were performed using both control catalytic systems comprising and catalytic systems according to the invention comprising, on the one hand, an identical organometallic complex according to the invention including fluorenyl groups and, on the other hand, various co-catalysts, likewise according to the invention, but with variation of the (co-catalyst/organometallic complex) molar ratio.

1) Organometallic Complex Used:

Chloro(μ-dimethylsilyl)bis(η5-fluorenyl)neodymium, of formula $[(C_{13}H_8)_2SiMe_2]NdCl$ was used, and this complex was prepared in the following manner.

a) Synthesis of a Compound of Formula $Me_2Si(C_{13}H_9)_2$:

6.5 mmol of $SiMe_2Cl_2$ are added to a solution of 13 mmol of $C_{13}H_9Li$ (obtained by reacting fluorene ($C_{13}H_{10}$) and butyllithium (BuLi)) in 100 mL of THF (tetrahydrofuran), which is cooled to −20° C. After returning to ambient temperature, the orange-coloured solution is stirred for 15 hours. The THF is evaporated and the residue is taken up in toluene. The salt (LiCl) is filtered out, then the filtrate is evaporated. An orange-coloured solid is obtained which is washed while cold with small quantities of heptane. Any residual fluorene is then sublimed at 85° C. under a vacuum and separated from the product, resulting in isolation of said compound of formula $Me_2Si(C_{13}H_9)_2$.

Elemental analysis of this compound reveals:

% C=86.43; % H=5.98 (theoretically, % C=86.55 and % H=6.22).

This compound was characterised by $^1H$ NMR at 300 MHz ($CDCl_3$) by taking note of the groups of peaks observed (values of δ (ppm), the integral of which corresponds to a number of protons):

−0.59 ppm for $(SiMe_2, 6H)$; 4.21 ppm for $(CH-(C_{13}H_9), 2H)$;

7.23 ppm for (4H)/7.32 ppm for (4H)/7.47 ppm for (4H)/7.83 ppm for (4H) ($CH=(C_{13}H_9), 16H$).

b) Synthesis of a Salt of Formula $Me_2Si(C_{13}H_8)_2Li_2$:

A solution of 8 mmol of BuLi is added to a solution of 4 mmol of said compound of formula $Me_2Si(C_{13}H_9)_2$ in 100 mL of toluene which is cooled to −20° C. After returning to ambient temperature, the red solution obtained is stirred for 15 hours and then refluxed for 3 hours with stirring. A yellow solid precipitates. The toluene is evaporated and then the solid obtained is washed while cold with small quantities of heptane and dried. A yellow solid corresponding to the salt of formula $Me_2Si(C_{13}H_8)_2Li_2$ is thus collected (with a yield of 85%).

c) Synthesis of the Organometallic Complex of Formula $[(C_{13}H_8)_2SiMe_2]NdCl$:

3.6 mmol of $NdCl_3$ are refluxed with stirring in 75 mL of THF for 12 hours. Then a solution of said salt of formula $Me_2Si(C_{13}H_8)_2Li_2$ (3.9 mmol) is added. The dark brown solution obtained is then stirred overnight with the THF being refluxed. The solvent is evaporated and the residue is taken up in toluene. The solid formed (LiCl) is filtered out. The toluene is evaporated to yield a dark brown solid corresponding to the organometallic complex of formula $[(C_{13}H_8)_2SiMe_2]NdCl$.

2) Copolymerization Tests 1 and 2 According to the Invention:

Two copolymerization tests were performed, each involving the introduction into a reactor containing 300 mL of toluene, of said organometallic complex $[(C_{13}H_8)_2SiMe_2]NdCl$ in a specific quantity by mass x (mg), of an ethylene-butadiene mixture having a variable molar fraction of butadiene y (%) and of a co-catalyst consisting of butyloctylmagnesium (BOMAG).

During the copolymerization, the internal pressure in the reactor was maintained at approximately 4 bar and the reactor temperature was maintained at 80° C.

After a reaction time t (min.), copolymerization is terminated by cooling and degassing the reactor, then the copolymer is obtained by precipitation in methanol. After drying, a mass m (g) of copolymer is obtained.

The co-catalyst was used in a (co-catalyst/neodymium) molar ratio equal to 2.

The following properties were determined for each ethylene and butadiene copolymer obtained:

the molar content X (%) of units resulting from butadiene in the copolymer, the glass transition temperature Tg of this copolymer, the microstructure of the butadiene units inserted in the copolymer chain, and the molecular mass Mn and polydispersity index Ip of this copolymer.

Table 1 below contains the data relating to each copolymerization test and to each copolymer synthesized.

TABLE 1

| Tests | x (mg) | Co-catalyst and (co-catalyst/neodymium) ratio | m (g) | t (min) | y (%) butadiene in monomers |
|---|---|---|---|---|---|
| No. 1 | 39.5 | BOMAG (2/1) | 12.7 | 420 | 20 |
| No. 2 | 33.6 | BOMAG (2/1) | 9.2 | 180 | 30 |

| Tests | τ (%) butadiene in copolymer | Tg (° C.) | Butadiene insertion | | | Mn (g/mol)/Ip |
|---|---|---|---|---|---|---|
| | | | % 1.2 | % trans-1,4 | % trans-1,2 cyclohexane | |
| No. 1 | 13.1 | −31.2 | 27.2 | 20.4 | 52.4 | 147,500/3.1 |
| No. 2 | 15.0 | −34.0 | 22.9 | 25.8 | 51.3 | 127,700/3.0 |

These results show that the catalytic systems according to these tests 1 and 2, which are in particular characterised by the use of fluorenyl groups in the organometallic complexes and by a (co-catalyst/neodymium) molar ratio of less than 8, make it possible to obtain copolymers of ethylene and butadiene which have a molar content of units resulting from butadiene of greater than 10%, a molar fraction of trans-1,2 cyclohexane linkages in these units of greater than 50%, a mass Mn of greater than 100,000 g/mol and an Ip index of less than 3.5.

3) Comparative Copolymerization Tests 3 and 4:

Two comparative tests 3 and 4 were performed with the same organometallic complex using the same method as for tests 1 and 2, except that the (co-catalyst/neodymium) molar ratio selected was equal to 20.

A co-catalyst consisting of butylmagnesium chloride (BuMgCl) was used for test 3, while butyloctylmagnesium (BOMAG) was used for test 4.

Following the example of Table 1, Table 2 below contains data relating to each copolymerization test and to each copolymer synthesized.

TABLE 2

| Tests | x (mg) | Co-catalyst and (co-catalyst/neodymium) ratio | m (g) | t (min) | y (%) butadiene in monomers |
|---|---|---|---|---|---|
| No. 3 | 23.1 | BuMgCl(20/1) | 4.2 | 60 | 20 |
| No. 4 | 39.7 | BOMAG(20/1) | 13.2 | 180 | 20 |

| Tests | $\tau$ (%) butadiene in copolymer | Tg (° C.) | % 1.2 | % trans-1,4 | % trans-1,2 cyclohexane | Mn (g/mol)/Ip |
|---|---|---|---|---|---|---|
| No. 3 | 11.8 | not measured | 19.4 | 23.0 | 57.6 | 10,000/1.2 |
| No. 4 | 11.0 | −28.5 | 21.8 | 24.6 | 53.5 | 7,800/1.5 |

These results show that the catalytic systems according to these comparative tests 3 and 4, which are characterised by the use of fluorenyl groups in the organometallic complexes but also by a (co-catalyst/neodymium) molar ratio equal to 20 which is not in accordance with the invention, do not make it possible to obtain copolymers of ethylene and butadiene simultaneously having a molar content of units resulting from butadiene of at least 8% and a molecular mass Mn of at least 50,000 g/mol (the copolymers obtained having a mass Mn of at most 10,000 g/mol).

4) Copolymerization Tests 5 to 9 According to the Invention:

Five further copolymerization tests were performed, each involving the introduction into a reactor containing 200 mL toluene of said complex [$(C_{13}H_8)_2SiMe_2$]NdCl in a specific quantity by mass x (mg) and of a co-catalyst consisting of butyloctylmagnesium chloride (BOMAG) with a (co-catalyst/neodymium) ratio equal to 2, then of a solution of butadiene obtained by solubilising a mass z (g) of butadiene in 400 mL of toluene.

The desired internal pressure P of the reactor is then established by the addition of ethylene (pressure of 20 bar for test 5 and of 10 bar for tests 6 to 9) and the temperature of the reactor is adjusted to 80° C. for tests 5 to 8 and to 60° C. for test 9.

The ethylene supply is then cut off and, as appropriate, the reactor temperature is maintained at 80° C. or at 60° C. during copolymerization.

After a reaction time t (min.), copolymerization is terminated by cooling and degassing the reactor, then the copolymer is obtained by precipitation in methanol. After drying, a mass m (g) of copolymer is obtained.

Table 3 below contains the data relating to each of tests 5 to 9 and to each copolymer synthesized.

TABLE 3

| Tests | x (mg) | Mass of butadiene z (g) | P (bar) | T (° C.) | m (g) | t (min) |
|---|---|---|---|---|---|---|
| No. 5 | 44.9 | 16 | 20 | 80 | 21.7 | 60 |
| No. 6 | 47.2 | 18 | 10 | 80 | 15.8 | 150 |
| No. 7 | 46.3 | 7 | 10 | 80 | 11.4 | 60 |
| No. 8 | 22.0 | 8 | 10 | 80 | 5.9 | 180 |
| No. 9 | 40.6 | 10 | 10 | 60 | 15.8 | 150 |

| Tests | $\tau$ (%) butadiene in copolymer | Tg (° C.) | % 1,2 | % trans-1,4 | % trans-1,2 cyclohexane | Mn (g/mol)/Ip |
|---|---|---|---|---|---|---|
| No. 5 | 20.4 | −43.8 | 55.0 | 25.0 | 20.0 | 260,000/1.8 |
| No. 6 | 30.4 | −45.8 | 53.5 | 27.8 | 18.7 | 70,700/2.0 |
| No. 7 | 19.7 | −42.8 | 45.5 | 25.2 | 29.3 | 73,200/1.9 |
| No. 8 | 20.0 | −43.2 | 44.5 | 26.7 | 28.8 | 378,600/2.8 |
| No. 9 | 23.6 | −47.6 | 57.0 | 22.7 | 20.3 | 801,450/1.9 |

These results show that the catalytic systems according to these tests 5 to 9 of the invention, which are in particular characterised by the use of fluorenyl groups in the organometallic complexes, by a (co-catalyst/neodymium) molar ratio equal to 2 and by a pressure in the reactor of greater than or equal to 10 bar, make it possible to obtain copolymers of ethylene and butadiene simultaneously having a molar content of units resulting from butadiene of greater than 15%, a molar fraction of trans-1,2 cyclohexane linkages in these units of greater than 15%, a molecular mass Mn of greater than 50,000 g/mol.

It will be noted that the copolymers obtained in tests 5, 8 and 9 advantageously have a mass Mn of greater than 200,000 g/mol, even of up to 300,000 g/mol, and an Ip index of less than 3.0.

Second Series of "Control" Copolymerization Tests

The catalytic systems used for these "control" tests comprised, on the one hand, a "control" organometallic complex including cyclopentadienyl groups and, on the other hand, various co-catalysts according to the invention with the (co-catalyst/organometallic complex) molar ratio being varied.

1) Organometallic Complex Used:

Chloro(μ-dimethylsilyl)bis(η5-trimethylsilylcyclopentadienyl)neodymium of formula $\{[(C_5H_3)SiMe_3]_2SiMe_2\}NdCl$ was used, which was prepared as follows.

a) Synthesis of a Compound of Formula $[(C_5H_4)SiMe_3]_2SiMe_2$:

16 mmol of a compound of formula $Li[(C_5H_4)SiMe_3]$, 8 mmol of $Me_2SiCl_2$ and 80 mL of THF are introduced into a Schlenk tube. The mixture is stirred overnight at ambient temperature. The solvent is evaporated and the residue is taken up with 40 mL of heptane. The solution is filtered and the solvent is evaporated. The product ultimately obtained is a viscous oil of the above-stated formula for said compound.

b) Synthesis of a Salt of Formula $[(C_5H_3)SiMe_3]_2SiMe_2Li_2$:

14 mmol of BuLi are added gradually at 0° C. to a Schlenk tube which contains a solution of THF comprising 7 mmol of said compound of formula $[(C_5H_4)SiMe_3]_2SiMe_2$. The mixture is stirred at ambient temperature for 6 hours and the above-stated salt is obtained in solution in THF.

c) Synthesis of the Organometallic Complex of Formula $\{[(C_5H_3)SiMe_3]_2SiMe_2\}NdCl$:

4 mmol of anhydrous $NdCl_3$ in THF are stirred and refluxed overnight. 4 mmol of said salt of formula $[(C_5H_3)SiMe_3]_2SiMe_2Li_2$ in solution in THF are then added. The mixture is then stirred for 36 hours at ambient temperature. The solvent is evaporated and the residue is taken up in toluene. The solution is filtered, then the product is crystallised at −20° C. Said organometallic complex is consequently obtained.

Centesimal elemental analysis of this complex reveals the following percentages for carbon atoms and hydrogen atoms:

% C=42.88 and % H=5.87 (theoretically: % C=42.36 and % H=5.92).

This complex was characterised by $^1$H NMR at 300 MHz ($C_6D_6$) by taking note of the groups of peaks observed (values of δ (ppm), the integral of which corresponds to a number of protons):

Two groups of peaks, the integral of each of which corresponds to 3 protons, are observed by this technique: a first group of peaks at 2.13 ppm and a second group of peaks at −8.97 ppm are each representative of the protons of $Si(CH_3)_2$ of this complex.

Finally, a group of peaks is observed at −2.99 ppm, the integral of which corresponds to 18 protons and which is representative of the protons of the two $Si(CH_3)_3$ substituents of said complex.

It will be noted that the peaks corresponding to the protons of $C_5H_3$ are not detected, probably because these peaks are very wide.

2) "Control" Copolymerization Tests 10 and 11:

Two first "control" tests were performed involving the introduction into a reactor containing 300 mL of toluene of said organometallic complex of formula $\{[(C_5H_3)SiMe_3]_2SiMe_2\}NdCl$ in a specific quantity x (mg), of an ethylene/butadiene mixture having a variable molar fraction y (%) of butadiene and of a co-catalyst. The latter consists of a mixture of butyllithium (BuLi) and diisobutylaluminium hydride (DiBAH) with a (co-catalyst/neodymium) ratio of 20/1 which is not in accordance with the invention.

The internal pressure of the reactor was maintained at approximately 4 bar. The temperature of the polymerisation reactor was maintained at 80° C. or 60° C. during polymerisation (for the tests 10 or 11, respectively).

After a reaction time t (min.), copolymerization is terminated by cooling and degassing the reactor, then the copolymer is obtained by precipitation in methanol. After drying, a mass m (g) of copolymer is obtained.

Table 4 below contains the data relating to each test 10 and 11 and to each copolymer synthesized.

TABLE 4

| Tests | x (mg) | (BuLi/DiBAH/neodymium) ratio | P (bar) | T (° C.) | m(g) | t (min) |
|---|---|---|---|---|---|---|
| No. 10 | 30 | 10/10/1 | 4 | 80 | 4.8 | 120 |
| No. 11 | 31 | 10/10/1 | 4 | 60 | 2.1 | 60 |

| Tests | y (%) butadiene in monomers | τ (%) butadiene in copolymer | Butadiene insertion % 1,2 | % trans-1,4 | Mn (g/mol)/Ip |
|---|---|---|---|---|---|
| No. 10 | 43.0 | 41.0 | 2.5 | 97.5 | 6,900/2.2 |
| No. 11 | 40.0 | 37.5 | 2.5 | 97.5 | 10,530/1.8 |

These results show that the catalytic systems according to these "control" tests 10 and 11, which are in particular characterised by the use of cyclopentadienyl groups in the organometallic complexes, do not make it possible to obtain copolymers of ethylene and butadiene having trans-1,2 cyclohexane linkages.

Furthermore, the (co-catalyst/neodymium) molar ratio equal to 20 which is used does not make it possible to obtain a molecular mass Mn of at least 40,000 g/mol for these copolymers.

3) "Control" Copolymerization Test 12:

The same method was used as for the above-stated "control" test 11, except for the fact that the catalytic system of this test 12 is characterised by the use of co-catalyst consisting solely of butyllithium and by a (co-catalyst/neodymium) ratio according to the invention which is equal to 2.

Table 5 below contains the data relating to this test 12 and to the copolymer obtained.

TABLE 5

| Test | x (mg) | (Co-catalyst/neodymium) ratio | P (bar) | T (° C.) | m(g) | t (min) |
|---|---|---|---|---|---|---|
| No. 12 | 55 | 2/1 | 4 | 60 | 2.3 | 240 |

| Test | y (%) butadiene in monomers | τ (%) butadiene in copolymer | Butadiene insertion % 1,2 | % trans-1,4 | Mn (g/mol)/Ip |
|---|---|---|---|---|---|
| No. 12 | 40.0 | 40.2 | 2.3 | 97.7 | 44,600/1.8 |

These results show that the "control" catalytic system of test 12, although characterised by a (co-catalyst/neodymium) molar ratio according to the invention which is equal to 2, does not make it possible to obtain a copolymer of ethylene and butadiene having trans-1,2 cyclohexane linkages, because it is characterised by the use of cyclopentadienyl groups in the organometallic complexes.

APPENDIX:

Determination of the Distribution of Molecular Weights of the Copolymers Obtained by Size Exclusion Chromatography (SEC)

a) Measurement Principle:

SEC (size exclusion chromatography) makes it possible physically to separate macromolecules by their size in the swollen state in columns filled with a porous stationary phase. The macromolecules are separated by their hydrodynamic volume, the bulkiest being eluted first. Although not an absolute method, SEC does enable an assessment to be made of the molecular weight distribution of a polymer.

Using commercial standards consisting of polystyrene (number average masses Mn from 580 g/mol to 3,150,000 g/mol), the different masses Mn and Mw can be determined and the polydispersity index calculated (Ip=Mw/Mn).

More precisely, the samples of polystyrene used have the following masses Mn (in g/mol): 580–1,700–2,960–28,500–66,000–170,600–526,000–1,290,000–3,150,000.

b) Preparation of the Polymer:

The polymer sample is not subjected to any particular treatment prior to analysis. It is simply solubilised in tetrahydrofuran to a concentration of approximately 1 g/l.

c) SEC Analysis:

The instrument used is a "WATERS" chromatograph with a "515 HPLC" pump and "RI 410" detector.

The elution solvent is tetrahydrofuran and the elution rate 1 mL/min.

A set of three columns is used, one being a "WATERS STYRAGEL HR 4E" column and two being "WATERS STYRAGEL HR 5E" columns.

The column temperature is 45° C. and the detector temperature 40° C.

The volume of polymer sample solution injected is 50 µl. The detector is a "WATERS 2140" differential refractometer and the chromatographic data processing software is the "WATERS MILLENNIUM" system.

The invention claimed is:

1. A copolymer of ethylene and butadiene comprising a molar content of units resulting from butadiene greater than or equal to 8%, said units comprising linkages in the form of trans-1,2 cyclohexane, and having a number-average molecular mass Mn of greater than or equal to 40,000 g/mol.

2. The copolymer of ethylene and butadiene according to claim 1, having a number-average molecular mass Mn of greater than or equal to 100,000 g/mol.

3. The copolymer of ethylene and butadiene according to claim 2, having a number-average molecular mass Mn of greater than or equal to 200,000 g/mol.

4. The copolymer of ethylene and butadiene according to claim 3, having a number-average molecular mass Mn of greater than or equal to 300,000 g/mol.

5. The copolymer of ethylene and butadiene according to claim 1, wherein said molar content of units resulting from butadiene is greater than or equal to 15%.

6. The copolymer of ethylene and butadiene according to claim 5, wherein said molar content of units resulting from butadiene is greater than or equal to 20%.

7. The copolymer of ethylene and butadiene according to claim 6, wherein said molar content of units resulting from butadiene is greater than or equal to 30%.

8. The copolymer of ethylene and butadiene according to claim 1, wherein said units resulting from butadiene comprise linkages in the form of trans-1,2 cyclohexane according to a molar fraction of greater than or equal to 10%.

9. The copolymer of ethylene and butadiene according to claim 8, wherein said units resulting from butadiene comprise linkages in the form of trans-1,2 cyclohexane according to a molar fraction of greater than or equal to 20%.

10. The copolymer of ethylene and butadiene according to claim 9, wherein said units bresulting from butadiene comprise linkages in the form of trans-1,2 cyclohexane according to a molar fraction of greater than or equal to 50%.

11. A process for the synthesis of the copolymer of ethylene and butadiene of claim 1, which comprises contacting ethylene and butadiene with a catalytic system in suspension or in solution, in a hydrocarbon solvent and at a temperature between −20° C. and 120° C., said catalytic system comprising:

(i) an organometallic complex represented by one of the following formulae A or B:

A:

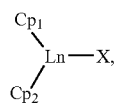

B:

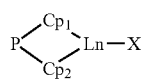

where Ln represents a lanthanide metal having an atomic number which may range from 57 to 71, where X represents a halogen which may be chlorine, fluorine, bromine or iodine, where, in the formula A, two identical or different ligand molecules $Cp_1$ and $Cp_2$, each consisting of a substituted or unsubstituted fluorenyl group, are attached to said metal Ln, where, in the formula B, a ligand molecule consisting of two identical or different fluorenyl groups $Cp_1$ and $Cp_2$, which are substituted or unsubstituted and are linked together by a bridge P satisfying the formula $MR_2$, where M is an element of column IVa of Mendeleyev's periodic table and where R is an alkyl group with 1 to 20 carbon atoms, is attached to said metal Ln, and (ii) a co-catalyst belonging to the group consisting of an alkylmagnesium, an alkyllithium, an alkylaluminium, a Grignard reagent, and a mixture thereof, wherein the (co-catalyst/organometallic complex) molar ratio falls within a range of from 1 to 8.

12. The process according to claim 11, wherein said (co-catalyst/organometallic complex) molar ratio falls within a range of from 1 to 3.

13. The process according to claim 11, wherein said organometallic complex is represented by said generic formula A.

14. The process according to claim 11, wherein said organometallic complex is represented by said generic formula B.

15. The process according to claim 14, wherein said element M included in said bridge P of formula $MR_2$ is silicon.

16. The process according to claim 11, wherein said lanthanide Ln is neodymium.

17. The process according to claim 11, wherein $Cp_1$ and $Cp_2$ each comprise an identical fluorenyl group.

18. The process according to claim 11, wherein said organometallic complex satisfies the formula $(C_{13}H_9)_2NdCl$, where $Cp_1$ and $Cp_2$ each consist of an unsubstituted fluorenyl group which satisfies the formula $C_{13}H_9$.

19. The process according to claim 14, wherein, in said organometallic complex, $Cp_1$ and $Cp_2$ each consist of an unsubstituted fluorenyl group which satisfies the formula $C_{13}H_8$.

20. The process according to claim 11, wherein said organometallic complex satisfies the formula $[(C_{13}H_8)_2SiMe_2]NdCl$.

21. The process according to claim 11, wherein said co-catalyst is selected from the group consisting of butyloctylmagnesium and butylmagnesium chloride.

22. The process for synthesising a copolymer of ethylene and butadiene according to claim 11, wherein said reaction is performed under a pressure within a range of from 3 to 50 bar.

* * * * *